Aug. 19, 1947.     D. BOHM     2,425,986
METHOD AND APPARATUS FOR FORMING THE RIMS OF CYLINDRICAL SHELLS
Filed Aug. 11, 1941     5 Sheets-Sheet 1

INVENTOR.
Daniel Bohm
BY
Barnes, Kisselle, Laughlin + Rausch
Attorneys

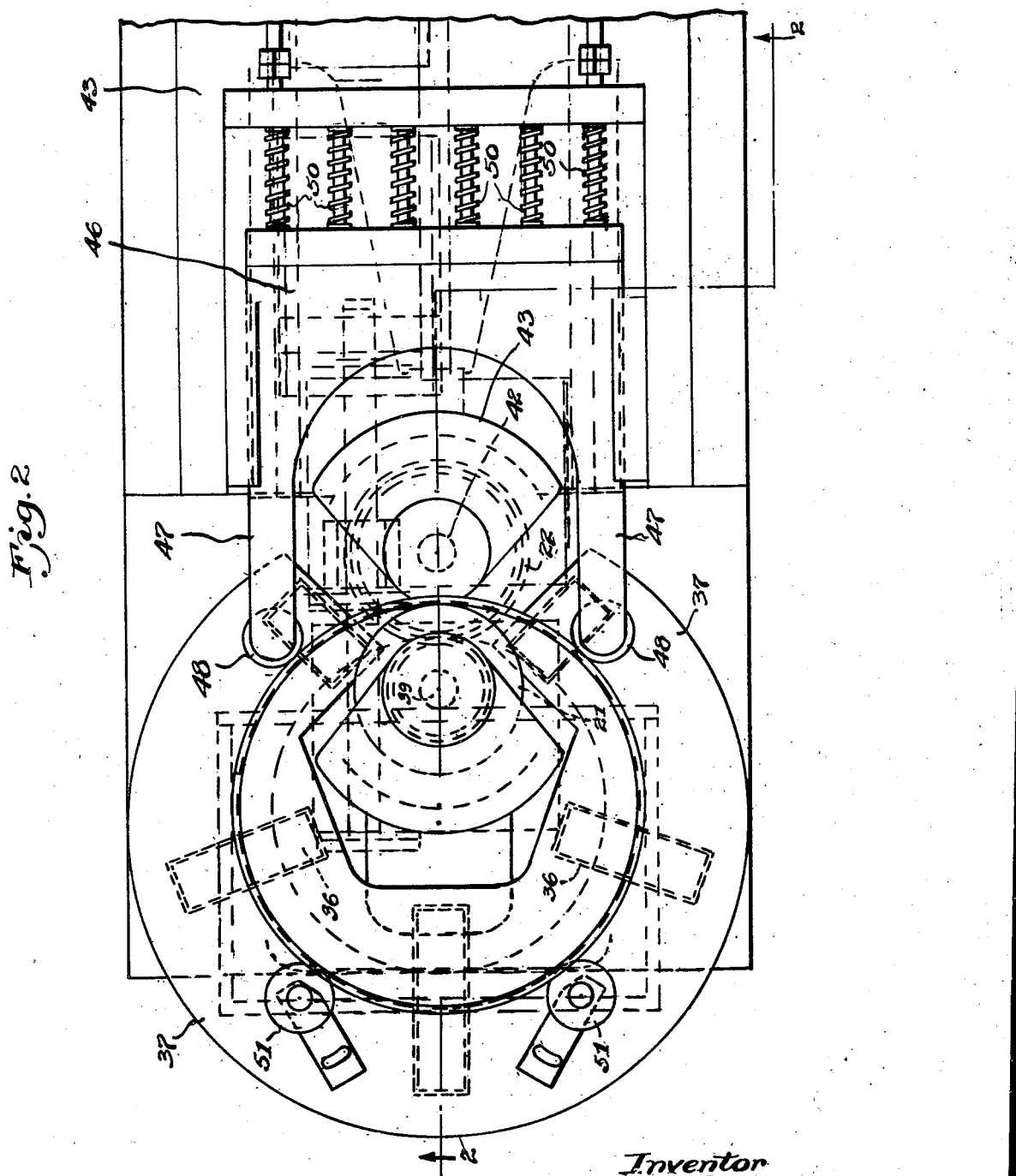

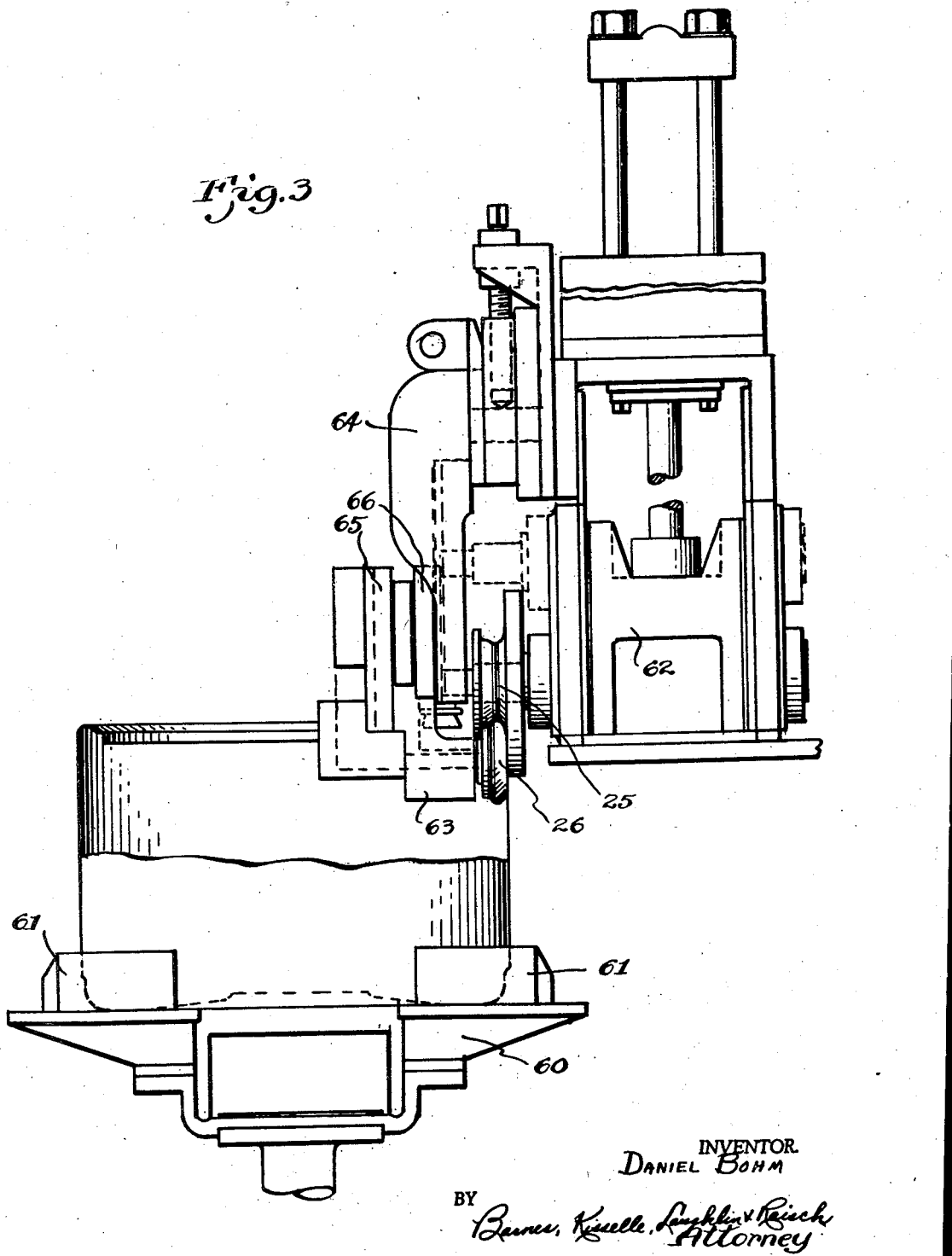

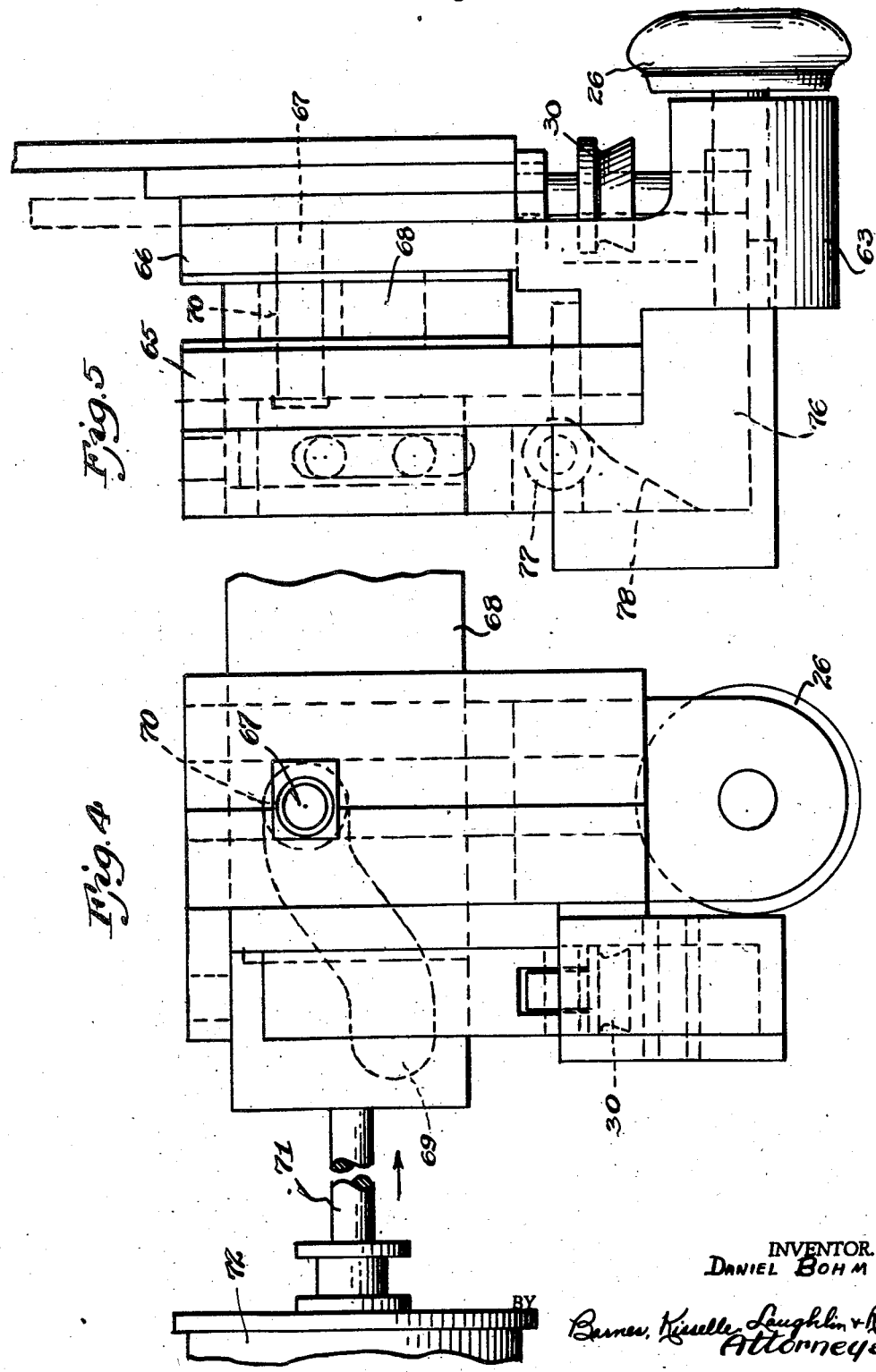

Aug. 19, 1947.  D. BOHM  2,425,986
METHOD AND APPARATUS FOR FORMING THE RIMS OF CYLINDRICAL SHELLS
Filed Aug. 11, 1941   5 Sheets-Sheet 5

INVENTOR.
DANIEL BOHM
BY Barnes, Kisselle, Laughlin & Raisch
Attorneys

Patented Aug. 19, 1947

2,425,986

UNITED STATES PATENT OFFICE 2,425,986

METHOD AND APPARATUS FOR FORMING THE RIMS OF CYLINDRICAL SHELLS

Daniel Bohm, Salem, Ohio, assignor to Mullins Manufacturing Corporation, Salem, Ohio, a corporation of New York Application August 11, 1941, Serial No. 406,366

6 Claims. (Cl. 113—120)

This invention relates to a method and apparatus for forming the rims of drawn cylindrical shells, and has particularly to do with the forming of the "necked-in" top or rim portion of washing machine tubs, buckets or the like; it relates to improvements over the method and apparatus disclosed in Patent No. 2,131,027, of September 27, 1938.

An object of the present invention is to provide a simplified method for forming these drawn tubs in a way which prevents waste and results in a smooth finished product.

Other objects of the invention have to do with the provision of a suitable machine for accomplishing the various steps rapidly and efficiently. Recent design has necessitated the formation of an annular seat at the necked-in portion of the washing machine tub for receiving the rim of a cover. The present invention contemplates a method for forming such seat and the steps for forming the necked-in portion.

Other objects and features of the invention, having to do with details of construction and operation, will be found in the following description and claims.

In the drawings:

Fig. 2 is a plan view of the apparatus.

Fig. 3 is an elevational view of the rolling mechanism for forming the final operations on the necked-in portion.

Figs. 4 and 5 illustrate more detailed views of a portion of Fig. 3.

Figure 6:
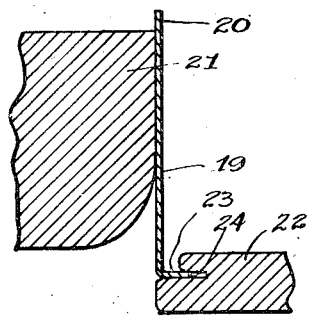
Figs. 6, 7, 8 and 9 represent the steps performed on the machine shown in Fig. 1.

The method will be described first and the apparatus for performing the same will be described hereafter. Referring to Fig. 6, a rim portion 19 of a drawn tub 20 is shown. Inside the tub is a shaped roller 21. A roller 22 has its axis parallel with the roller 21 but is arranged to move toward the roller 21. When the tub is drawn, a flange 23 is formed thereon and trimmed in the usual manner. The tub is then placed on a machine having rollers 21 and 22. Roller 22 has an annular grooved portion 24 which receives the flange 23. As the roller 22 moves toward roller 21, the rim portion 19 is shaped around the roller 21.

Figure 7:
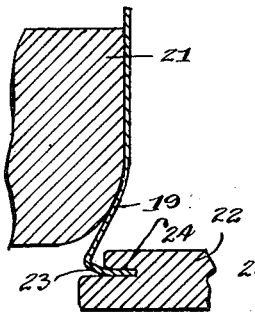
Figure 8:
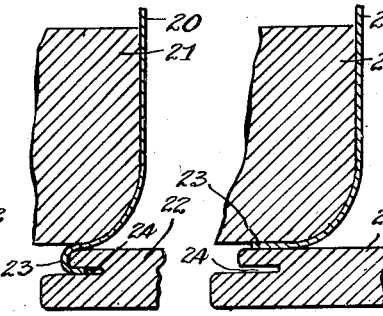
Figure 9:
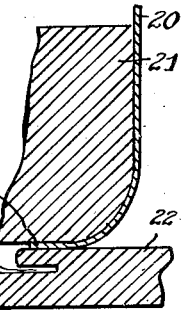
Figure 10:
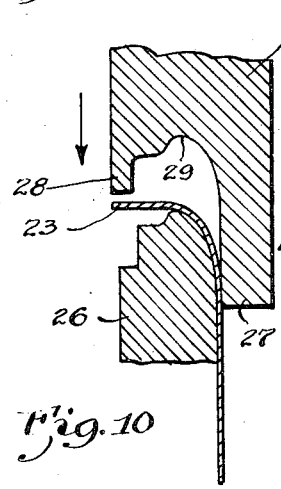
Figs. 10, 11 and 12 illustrate the steps performed on Fig. 3.
Figure 11:
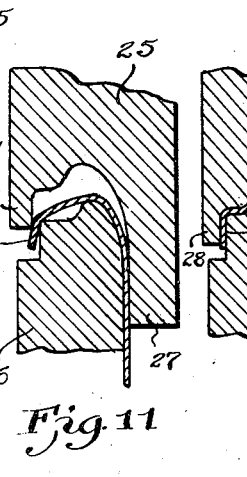

The first step is shown in Fig. 7. As the movement of roller 22 continues, roller 22 starts to overlap roller 21 to confine the tub rim between the rollers. Continued movement causes the flange 23 to be drawn out of the groove 24 and to be flattened against roller 21, see Fig. 9, to form an inwardly extending flange. It should be noted that the rolls 21 and 22 are axially spaced but arranged for radial overlap movement. It is the confining action of these rolls plus the overlap movement that makes possible the unwrapping action from one roll to another.

Figure 1:
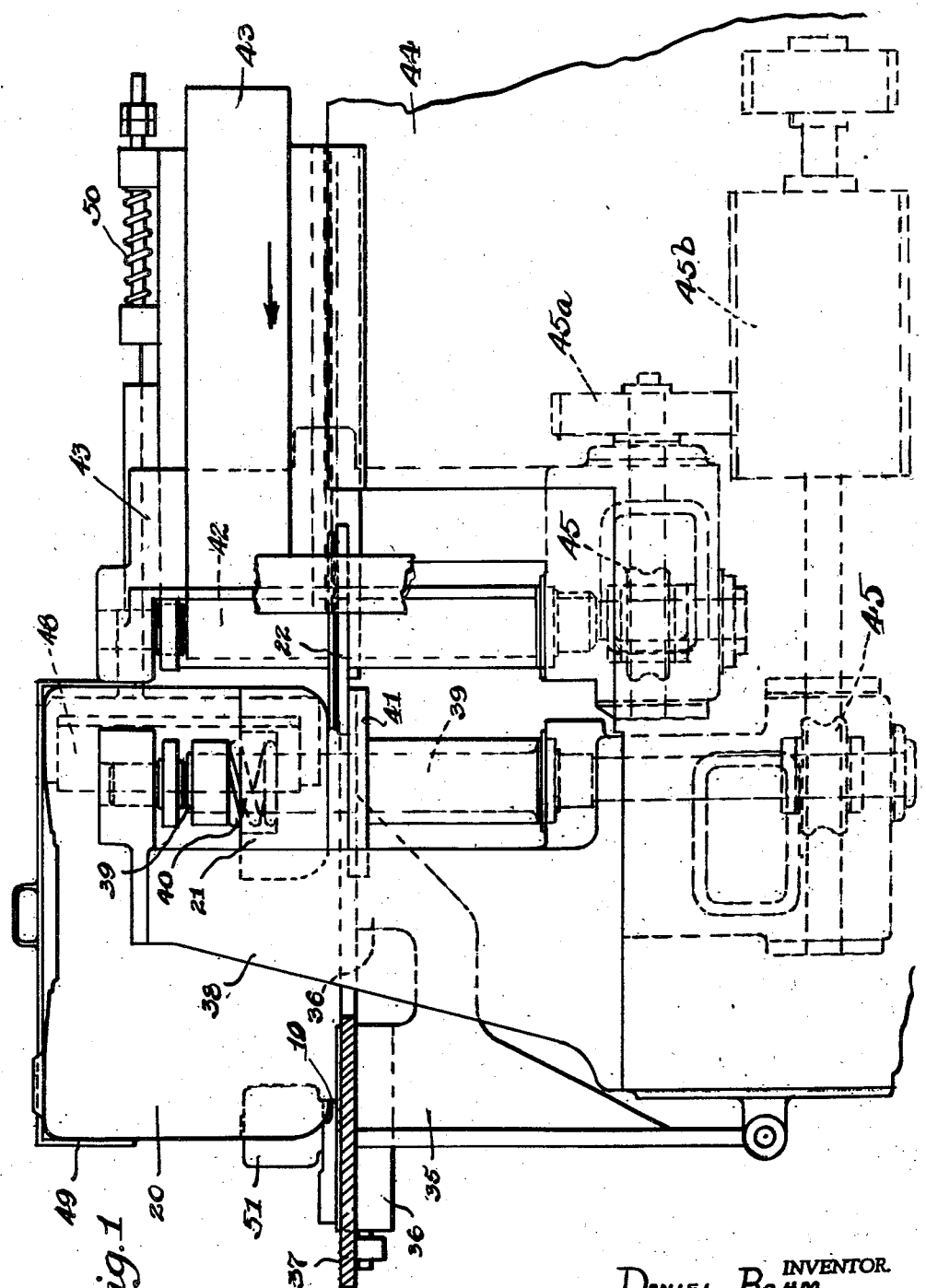
Fig. 1 is a side elevation of the apparatus for forming the first step for the necking-in operation.
Figure 12:
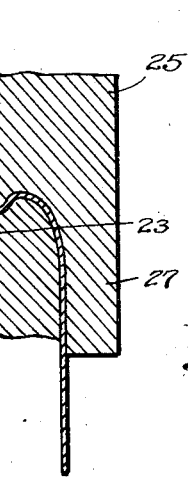

During these steps in the formation, the tub is upside-down, as shown in Fig. 1. The tub is then turned rightside-up and inserted in the second machine having a roller 25 and a roller 26 which coöperate with each other. The roller 25 has two radially extending portions 27 and 28 and a curved formation 29 in between these portions. The roller 26 is formed complementally so that as the rollers approach each other with the tub in position as shown, the first point of contact is on the inner surface of portion 27 where a rolling contact is set up and the metal is confined. The second point of contact is between flange 23 of the tub and portion 28 of roll 25. As the rolls continue to move toward each other, the flange 23 becomes confined between the two rolls, leaving the intermediate portion free. Completion of the movement causes the formation of the annular seat in the tub in the portion of the rim between the two confined portions. After the formation, as shown in Fig. 12, roll 26 is moved down and another roller 30 is moved into position to shape the flange 23 so that it is turned downwardly and towards the outside of the tub. During this movement, the curved rim portion 19 is sufficiently rigid, due to its own formation, that no other reenforcement is needed.

Now taking up the mechanism shown in Figs. 1 and 2, a support for the tub 20 consists of a base 35 with spaced supporting plates 36. On these supporting plates is a circular table 37. Roller 21 is supported on a vertical yoke 38 and a shaft 39 passing between spaced members of said yoke. The roller 21 is floatingly mounted on said shaft 39 and a heavy spring 40 urges the roller down to the position shown. A second roller support 41 is also supported on shaft 39 in spaced relation to roller 21. The roller 22 is supported on a shaft 42 which in turn is supported on a vertical yoke 43. The yoke 43 is slidable on the base 44 of the machine and suitable means, such as an air or hydraulic cylinder is provided to move the yoke in order that roller 22 will have the movement previously described. Suitable screw and gear connections 45 are provided to drive shafts 39 and 42 in opposite directions. Note gear 45a which slides on gear 45b during movement of yoke 43.

As viewed in Fig. 2, slidable on yoke 43 is a horizontal flat auxiliary yoke member 46 having parallel arms 47. At each end of these arms is mounted a vertical roller 48. When the tub is in the machine of Fig. 1, a rim 49 is placed over the bottom of the tub to give support to the sides thereof. The rollers 48 contact this rim and are urged against it by action of springs 50. The tension of these springs increases as yoke 43 moves toward the tub. Idle rolls 51 are provided on the other side of the tub to hold it in place.

Figure 13:
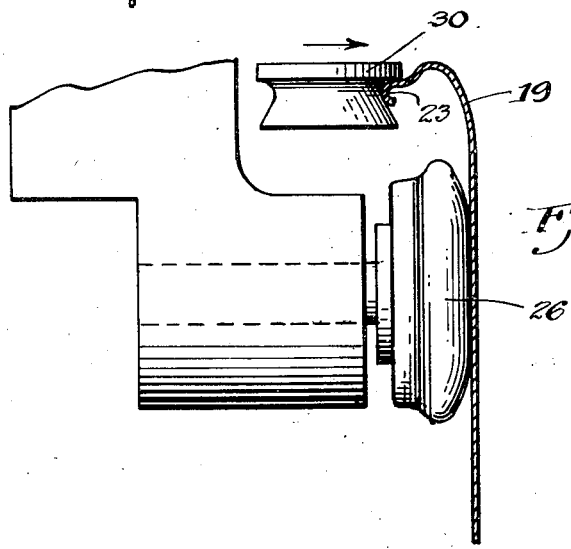
Fig. 13 illustrates the final curling-in step.

Rollers 25 and 26 are supported in the mechanism shown in Fig. 3. In this mechanism, the tub is supported on a table 60 having a collapsible chuck 61 for holding it in place. Roller 25 is mounted on a slide 62 which can move the roller forcibly downward. Roller 26 is supported on a frame 63 which in turn is supported on a depending arm 64. Frame 63 has two parallel members 65 and 66 in which the ends of a pin 67 are mounted, Figs. 4 and 5. A slide 68 also passes between these members 65 and 66 and is provided with a cam slot 69 in which pin 67 with a roller 70 operates. Slide 68 is connected by a rod 71 to a piston-cylinder motor 72 which, when actuated, will forcibly move the slide. Frame member 63 is so mounted on arm 64 that when slide member 68 is moved in the direction of the arrow, shown in Fig. 4, the slide member will move downwardly by the camming action of the slide. Also, mounted on frame 63 is a roller 30 and a slide member 76 which has a yoke formation for mounting the roller 30. The downward motion caused by movement of slide 68, also causes a downward movement of roller 30 and a roller 77 acting on a cam surface 78 causes movement of roller 30 toward the rim of the tub, as shown in Fig. 13. As the tube is revolving on table 60, the entire rim is turned in, as shown in Fig. 13. This is the final operation.

I claim:

1. A method of forming a relatively deep draw adjacent the edge of a moving wall of sheet metal which comprises pre-shaping and trimming one edge of said wall, setting up movement between the wall and forming units of predetermined shape, subjecting said wall to said forming units during relative movement between said units to shape said wall, confining said preshaped edge in one plane during a portion of said relative movement by one of said forming units, and, after a predetermined relative movement of said units, unwrapping said flange around one of said units and confining said edge between overlapping portions thereof in a different plane.

2. The method of forming a metal washing machine tub which comprises forming a cylindrical tub with an outwardly extending trimmed flange at an open end, supporting the inside of said tub adjacent said flange with a shaped roller, necking-in a portion of said tub adjacent said flange by temporarily confining said flange in one plane in a groove in a forming roll having axial clearance with said shaped roller and moving said rolls relative to each other until said flange is unwrapped around one and confined between overlapping surfaces of said rolls in a different plane, and confining said flange and a portion of said tub adjacent said necked-in portion between moving surfaces and shaping the metal between said confined portions to form an annular seat.

3. That step in the method of forming the rim of a tub in a necking-in operation which comprises, in a continuous step, confining a portion of said rim spaced from the edge between moving surfaces of axially spaced forming elements during the entire step, temporarily confining a portion of the rim directly adjacent the edge in one plane between spaced surfaces of one of said elements while moving said elements relative to each other, and during continuous movement of said elements, causing additional relative movement to move said last named edge portion out from between said spaced surfaces and into the axial space between the moving surfaces where it is further shaped in a different plane.

4. The method of forming a metal washing machine tub which comprises forming a cylindrical tub with an outwardly extending flange at the open end, providing a contoured support on the inside of said tub adjacent said flange, temporarily confining a portion of said flange in one plane between parallel surfaces and applying force radially inward between said flange and said support thereby forcing the flange, while so confined, radially inward of the tub, and causing the flange, by said radial inward force, to draw gradually from between parallel surfaces and to wrap around the contour of the inner support entirely outside said surfaces and in a different plane.

5. The method of forming the edge of a metal washing machine tub which comprises forming a cylindrical tub with an outwardly extending flange, temporarily confining said flange in one plane against lateral movement and exerting force normal to the tub walls to cause a flare in said wall opposite the original direction of the flange and in another plane, confining the flared portion adjacent the edge and at the point spaced from the edge, and forming material of the flare between said confined points.

6. A mechanism for forming a relatively deep draw adjacent the edge of a moving wall of sheet metal, comprising axially spaced rollers radially movable relative to each other having radial surfaces adapted to move in overlapping relation after a predetermined movement, one roller located on one side of said wall and the second on the other, the first roller being provided with an annular groove with parallel sides adapted to receive and temporarily confine a preformed edge of said tub in one plane, and means to move said first roller transversely of the wall being formed and radially toward and over the other roller, said radial surfaces being axially spaced to confine and exert pressure on a localized portion of said wall after predetermined relative movement and thereby serve as a hold-down to cause metal to flow in the forming action, and to effect an unwrapping of said preformed edge from said first roll to a different plane on said second roll as said rolls overlap in movement.

DANIEL BOHM.

REFERENCES CITED

The following references are of record in the file of this patent:

UNITED STATES PATENTS

| Number | Name | Date |
|---|---|---|
| 2,206,296 | Clark | July 2, 1940 |
| 2,253,293 | Greif | Aug. 19, 1941 |
| 2,131,945 | Gibbs | Oct. 4, 1938 |
| 1,931,151 | Mueller | Oct. 17, 1933 |
| 1,793,296 | Wilson | Feb. 17, 1931 |
| 1,098,567 | Grandmont | June 2, 1914 |
| 2,188,477 | LeJeune | Jan. 30, 1940 |
| 1,609,171 | Hughes | Nov. 30, 1926 |
| 2,119,662 | Williams | June 7, 1938 |
| 2,063,455 | McManus | Dec. 8, 1936 |
| 1,870,062 | Moore | Aug. 2, 1932 |
| 1,914,867 | Rollason | June 20, 1933 |
| 2,131,027 | French et al. | Sept. 27, 1938 |
| 2,135,877 | Rodman | Nov. 8, 1938 |
| 2,084,467 | Vogan | June 22, 1937 |
| 2,170,946 | Grief | Aug. 29, 1939 |